G. E. ALTON.
CUSHION WHEEL.
APPLICATION FILED AUG. 14, 1915.
1,158,422.
Patented Nov. 2, 1915.
2 SHEETS—SHEET 1.
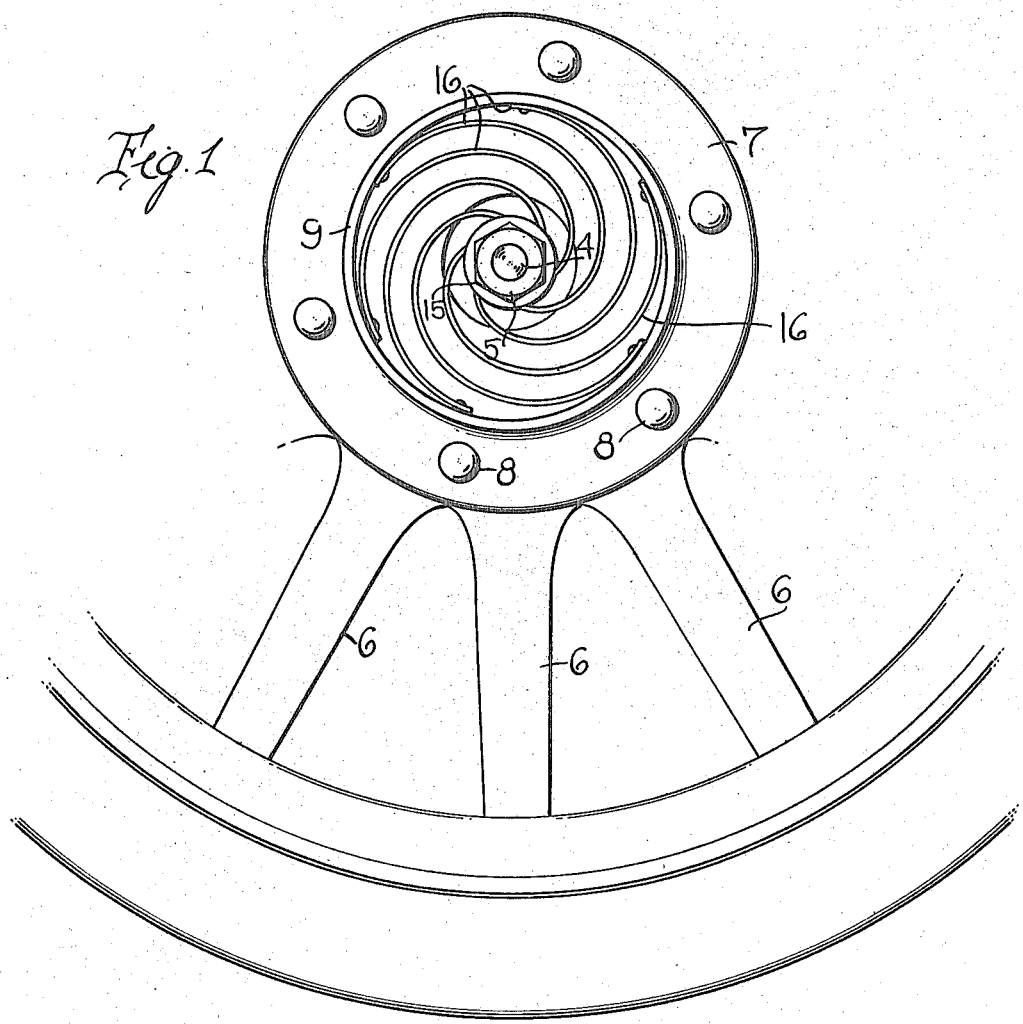
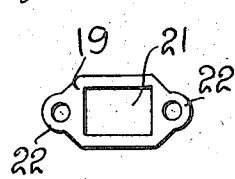
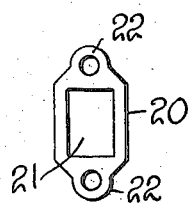
Inventor
G. E. Alton.
By Watson E. Coleman
Attorney

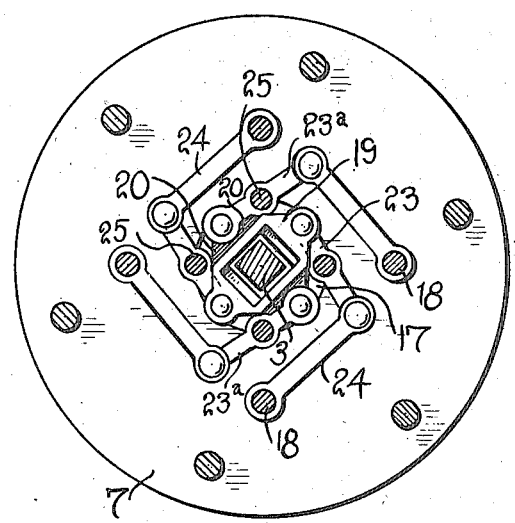
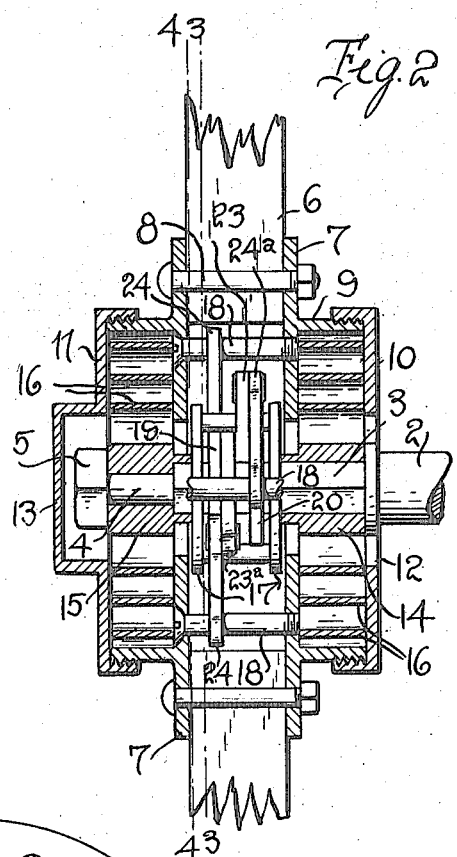
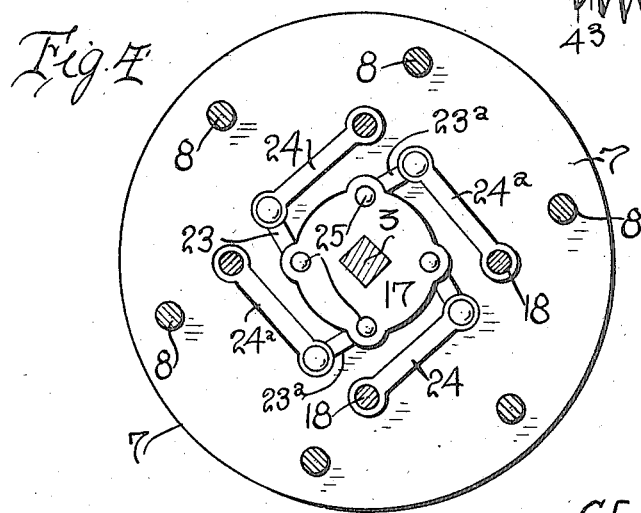

UNITED STATES PATENT OFFICE.

GEORGE E. ALTON, OF HAWKEYE, IOWA.

CUSHION-WHEEL.

1,158,422.     Specification of Letters Patent.     Patented Nov. 2, 1915.

Application filed August 14, 1915. Serial No. 45,570.

*To all whom it may concern:*

Be it known that I, GEORGE E. ALTON, a citizen of the United States, residing at Hawkeye, in the county of Fayette and State of Iowa, have invented certain new and useful Improvements in Cushion-Wheels, of which the following is a specification, reference being had to the accompanying drawings.

My invention relates to wheels, and particularly to cushion wheels designed to do away with the necessity of using pneumatic tires.

The primary object of my invention is the provision of a cushion wheel wherein springs are disposed between the hub of the wheel and the axle, these springs permitting but yieldingly resisting relative movement of the wheel and the axle, and means in connection with the axle and wheel whereby the rotative power of the wheel may be transmitted to the axle or relative power may be transmitted from the axle to the wheel.

A further object of my invention is the provision of a very simple mechanism to this end, including a plurality of links operatively connected to the axle and to the wheel, the links being so arranged that they will yield readily upon a force being exerted in any radial direction but will act to pull or push upon the axle or the wheel to cause a unitary rotation of the axle and wheel.

Other objects will appear in the course of the following description.

My invention is illustrated in the accompanying drawings, wherein:

Figure 1 is a fragmentary side elevation of an automobile wheel with my improvement applied thereto, the end cap being removed; Fig. 2 is a diametrical section through the hub portion of the wheel, the adjacent end of the axle being shown in elevation; Fig. 3 is a section through the axle and hub portion of the wheel, the spokes being omitted. This section is taken on the line 3—3 of Fig. 2; Fig. 4 is a section on the line 4—4 of Fig. 2, the spokes being omitted; Fig. 5 is a face view of one of the yokes connecting the links to the axle; and Fig. 6 is a like view of the other yoke.

Referring to these drawings, and particularly to Figs. 2, 3 and 4, it will be seen that my improved wheel has an axle 2 having a squared shank 3 and a reduced extremity 4 screw threaded for engagement with a nut 5. The spokes 6 of the wheel are supported by the annular plates 7 to which the spokes are bolted by means of bolts 8, and each of these annular plates is provided with an annular outwardly extending flange 9 exteriorly screw threaded for engagement with the caps 10 and 11. The cap 10 on the inner face of the wheel is formed with the relatively large central opening 12, larger than the axle. The cap 11 has an outwardly projected central portion 13 which accommodates the nut 5, the diameter of the opening 12 and of the central projected portion 13 of the cap 11 being large enough to permit a movement of the caps 10 and 11 relative to the axle 2. Surrounding the squared portion 3 of the axle 2 and therefore fixed to the axle is a sleeve 14 and also engaged with the outer end of the squared portion of the axle and surrounding the reduced portion 4 is a sleeve 15 which corresponds in function with the sleeve 14 and rotates with the axle.

Disposed between the sleeves 14 and 15 and the flange 9 are a plurality of volute springs 16 as shown most clearly in Fig. 1, these springs being attached in any suitable manner to the sleeves 14 and 15 and bearing against the inner faces of the flanges 9 to which they may be attached, if desired. These springs hold the flanges 9 and therefore the hub portion of the wheel in concentric spaced relation to the axle and to the sleeves 14 and 15, and the springs are housed between the outside faces of the plates 7 and the caps 10 and 11 as shown clearly in Fig. 2.

Mounted upon the squared portion 3 of the axle 2 between the plates 7 are oppositely disposed disks 17, these disks having square apertures to receive the squared portion of the axle. Extending between the plates 7 adjacent the flanges 9 are the screws or bolts 18. Disposed between the plates 17 are the yokes 19 and 20. Each of these yokes is the same in shape. Each yoke has an elongated rectangular aperture 21 which fits the squared portion of the shaft in one dimension but is greater in its other dimension than the cross section of the shaft. Thus the yokes will rotate with the shaft but have sliding engagement therewith transversely of the shaft. The yoke 20 is disposed at right angles to the yoke 21. Each of the yokes is formed at its ends with the lugs 22. Pivoted to the lugs of the yoke 19 are the ends of the levers 23, these levers extending in opposite directions as illustrated clearly in Fig. 3 and being in turn pivoted to the links 24 which in turn at their extremities are pivoted to the bolts 18 as seen clearly in Figs. 3 and 4. There are thus a pair of levers 23 pivoted to the yoke 19 and connected each by a link 24 to the hub plates 7. The yoke 20, as previously stated, is set at right angles to the yoke 19 and to its lugs are pivoted the levers 23ª to the extremities of which are the links 24ª in turn pivoted to the corresponding bolts 18. Each of the levers 23 and 23ª at its middle is pivotally connected by means of a bolt or rivet 25 to the disks 17 as illustrated more clearly in Fig. 4. It will be seen from Fig. 2 that the sleeves 14 and 15 bear at their ends against these disks 17 and thus prevent any lateral movement of the wheel and the hub mechanism with relation to the yokes, the levers, and the disks 17.

The operation of my invention will be obvious from what has gone before. The springs 16, as before stated, support the hub yieldingly in spaced relation to the axle. Under a load, however, which will cause the downward movement of the axle relative to the wheel all of the springs will be placed under tension, either compressive or expansive, and the wheel and hub structure will move upward relative to the axle by reason of the links and levers 23, 23ª, 24 and 24ª. The arrangement of the links and levers is such that the hub structure and wheel will shift under strain in any radial direction, but at the same time power which may be applied to the axle 2 will be transmitted to the yokes and to the plates 17 and cause a rotation of the plates 17 and of the yokes, this rotation causing a pull or push to be exerted upon the levers 23 and 23ª which will be transmitted by the links 24 and 24ª to the bolts 18 and thus to the hub structure. Of course power will be transmitted from the wheel to the axle in the same manner.

A practical demonstration will show that a wheel constructed in this manner will readily shift relative to the axle in any radial direction, but that torsion or stress will not be applied to the springs. Thus the resistance of the load to the rotation of the wheel under the power of the shaft 2 will not cause any flexing of the springs but on the contrary this power will be positively transmitted to the wheel, without, however, in any way retarding or preventing the proper cushioning action of the springs 16.

It will be seen also that the device is readily disassembled by removing the cap 11 and removing the nut 5 whereupon the wheel may be withdrawn from the axle in the usual way.

Having thus described my invention, what I claim is:

1. A cushion wheel comprising an axle having a squared portion, annular hub plates surrounding the axle and having outwardly projecting annular flanges, springs operatively engaging at their inner ends with the axle and operatively engaging at their outer ends with said flanges to hold the hub in spaced relation to the axle, bolts connecting said hub plates, a plurality of yokes mounted upon the squared portion of the axle and having rectangular elongated openings through which the axle passes, levers pivoted to said yokes, links pivoted to the levers and to the hub plates, and members mounted upon the axle for rotation therewith and upon which said levers are pivotally mounted.

2. A cushion wheel comprising an axle having a squared portion, a hub structure including oppositely disposed spaced annular hub plates, each of said hub plates having an outwardly projecting annular flange, caps having screw threaded engagement with said flanges, springs disposed between the caps and the hub plates, said springs having operative engagement with the hub and with the flanges to hold the hub in spaced relation to the axle, disks mounted upon the squared portion of the axle for rotation therewith, yokes mounted intermediate the disks and having elongated rectangular openings through which the axle passes and whereby the yokes may have sliding engagement with the axle by rotation therewith, a plurality of levers each pivoted at its inner end to one of said yokes, and links pivoted to the outer ends of the levers extending tangentially and pivotally secured to the hub plates, the middle of each lever being pivotally supported upon said disks.

3. A cushion wheel comprising an axle having a squared portion and terminating in a reduced screw threaded portion, a hub comprising oppositely disposed annular hub plates surrounding the axle, each of said hub plates having an outwardly projecting annular flange, caps engaging said flanges and surrounding the axle but having spaced relation thereto, sleeves engaging with the squared portion of the axle, springs disposed between the sleeves and the flanges of the hub plates and operatively engaged with both to support the hub in spaced relation to the sleeves and axle, disks mounted upon the squared portion of the axle intermediate said sleeves and bearing against the latter, yokes disposed between the disks, each yoke having an elongated rectangular aperture snugly fitting the shaft in one dimension but slidable thereon in the oposite direction, levers pivoted each intermediate its length to one of said disks and each pivoted at its inner end to one of said yokes, and links pivoted to the extremities of the levers and pivotally connected to the hub plates.

In testimony whereof I hereunto affix my signature in the presence of two witnesses.

GEORGE E. ALTON.

Witnesses:
 J. E. ALTON,
 HIRAM P. CLARK.